United States Patent [19]

Floreancig et al.

[11] Patent Number: 4,879,933
[45] Date of Patent: Nov. 14, 1989

[54] AUTOMATIC DEVICE FOR TRIMMING SHEETS OF LAMINATED MATERIAL

[75] Inventors: Eligio M. Floreancig, Jemeppe Sur Sambre; Jean-Claude M. Jandrain, Warnant Anhee; Desire M. Legros, Jemeppe Sur Sambre; Jean-Claude M. Simonon, Auvelais, all of Belgium

[73] Assignee: Saint-Gobain Vitrage, Courbevoie, France

[21] Appl. No.: 127,462

[22] Filed: Dec. 2, 1987

[30] Foreign Application Priority Data

Dec. 2, 1986 [FR] France .................................. 86 16791

[51] Int. Cl.⁴ .............................................. B26D 7/10
[52] U.S. Cl. ........................................ 83/76.1; 83/171
[58] Field of Search ................... 83/71, 171, 56, 109, 83/157, 451, 578, 613

[56] References Cited

U.S. PATENT DOCUMENTS

| | | | |
|---|---|---|---|
| 3,874,975 | 1/1975 | Lagain | 83/171 X |
| 3,932,962 | 1/1976 | Devillers | 83/71 X |
| 4,348,924 | 9/1982 | Jenkner | 83/39 |
| 4,475,422 | 10/1984 | Lawson | 83/13 |
| 4,624,169 | 11/1986 | Nelson | 83/881 |
| 4,653,362 | 3/1987 | Gerber | 83/16 |
| 4,713,994 | 12/1987 | Guglielmetti et al. | 83/71 |

Primary Examiner—Donald R. Schran
Assistant Examiner—Eugenia A. Jones
Attorney, Agent, or Firm—Oblon, Spivak, McClelland, Maier & Neustadt

[57] ABSTRACT

An automatic cutting device for trimming off the parts (15) of an intermediate sheet (6) of plastics material which extend beyond a laminated pane (2) during manufacture. The device comprises a cutting head (1) provided with a blade (10) carried by a blade holder (23) which is heated by induction; means (11, 16) which hold the parts of the sheets of plastics material to be cut in a position at least substantially perpendicular to the plane containing the cutting edge of the blade (10); and means (9) causing relative displacement of the cutting head (1) along the edge of the pane (2).

18 Claims, 3 Drawing Sheets

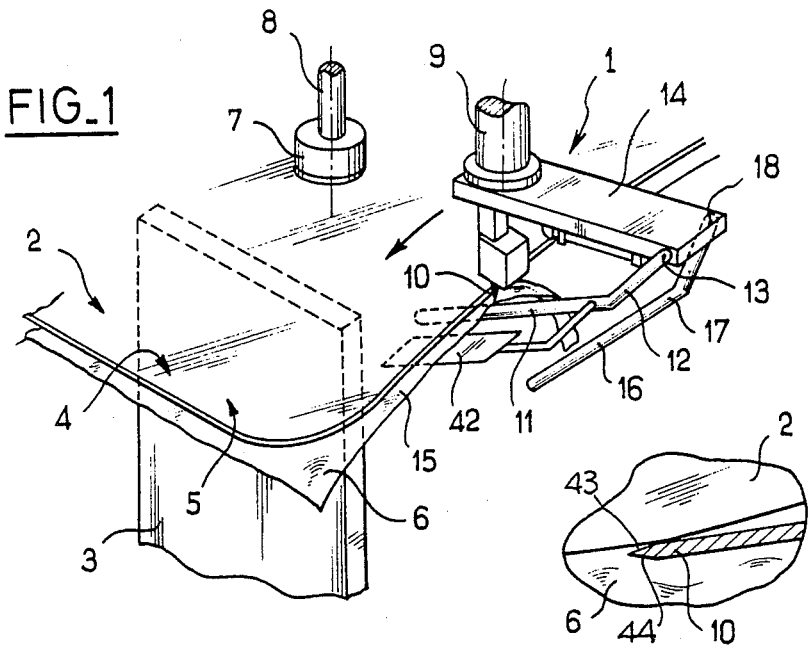
FIG_1
FIG_1a
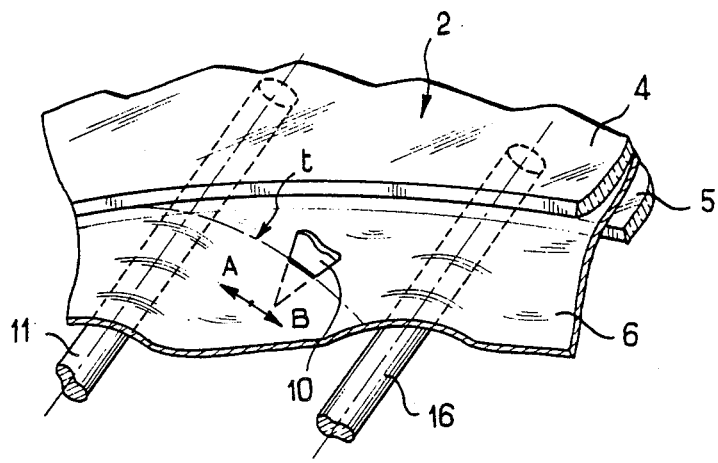
FIG_4

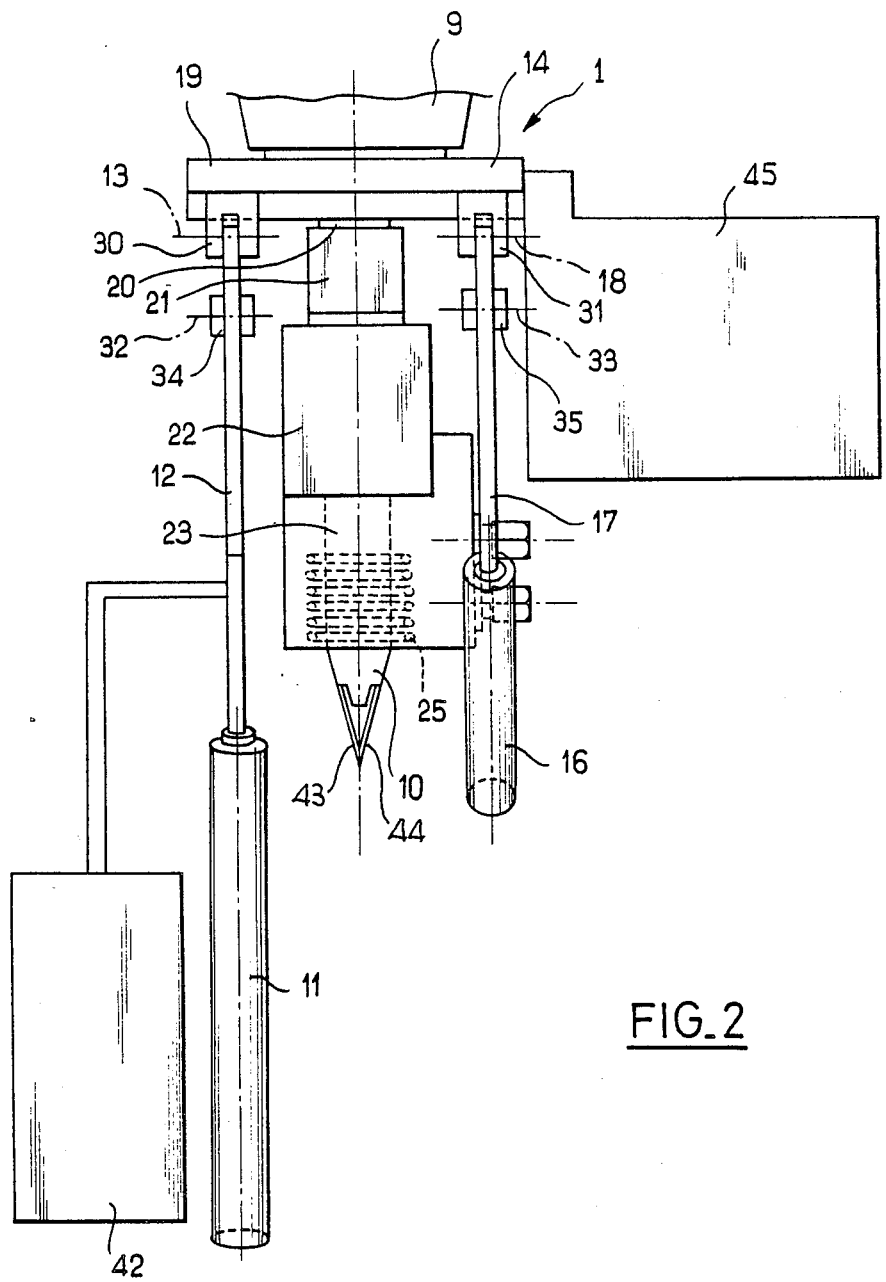
FIG_2

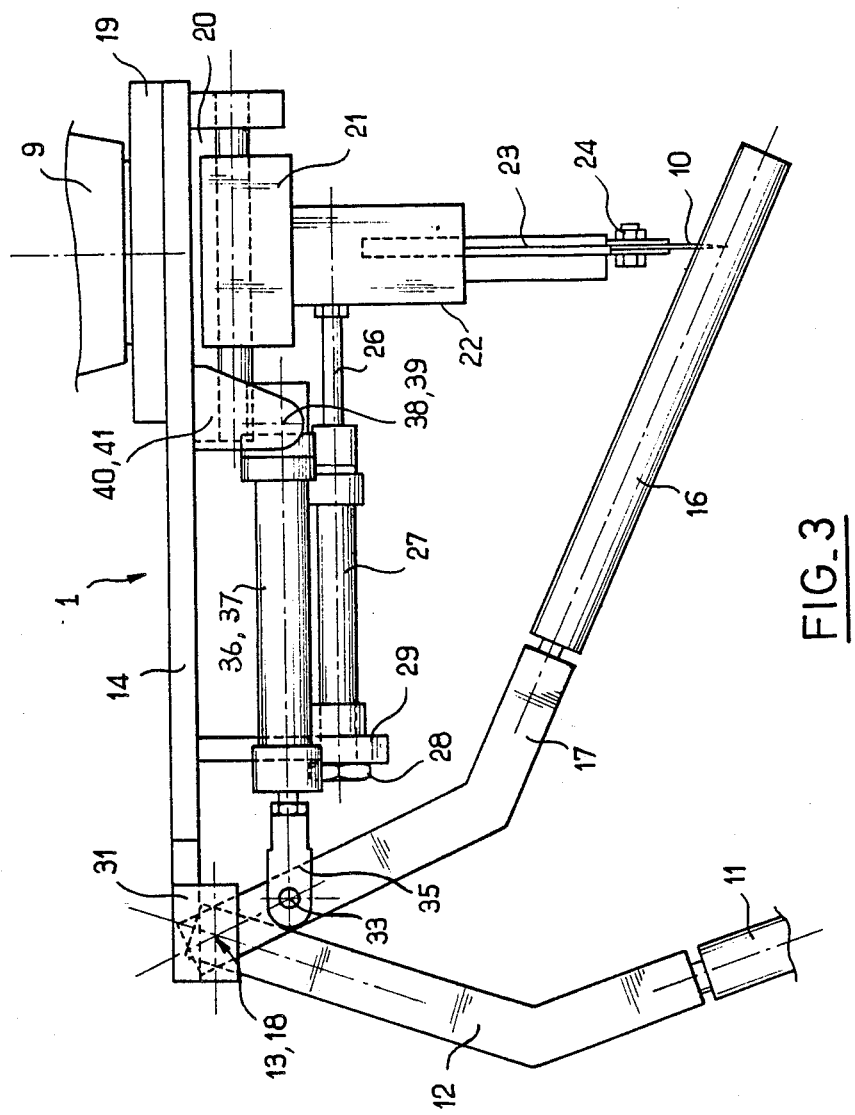
FIG_3

AUTOMATIC DEVICE FOR TRIMMING SHEETS OF LAMINATED MATERIAL

FIELD OF THE INVENTION

The present invention relates to cutting of sheets or films formed of one or more layers of plastics material. In particular, it relates to cutting of transparent or translucent sheets capable of being used in manufacture of laminated panes. Still more particularly, the invention relates to a device for cutting sheets which are temporarily or finally assembled with other elements of the pane by trimming off the edges.

BACKGROUND OF THE INVENTION

In the manufacture of laminated panes, notably safety panes formed of two glass sheets and an intermediate sheet or layer of plastics material (for example, a polyvinylbutyral or polyurethane), the elements forming each pane are assembled together by stacking of the elements. The stacking step is generally followed by calendering by passage of the stack between press rollers and an autoclave cycle.

At the time of stacking the elements, the intermediate sheet of plastics material is in the form of a blank which is generally quadralateral. The dimensions of the quadralateral blank are slightly greater than those of the pane to be produced.

After stacking and before calendering, the parts of the intermediate sheet which extend beyond the glass sheets are cut manually by trimming the edge using a metal blade, the operator who carries out this cutting holding the blade in contact against the edge of the glass sheets. This is a manual operation which is long and expensive. Also, the manual operation is frequently found to have been imprecise, and it is then necessary to carry out further trimming (generally after the autoclave cycle) in order to remove the parts of the intermediate plastic sheet which still extend beyond the glass sheet.

Another disadvantage of the manual cutting operation is that the tool runs the risk of attacking the edges of the glass sheets and thus of making the pane fragile.

Further, the width of the material removed cannot generally be less than a certain value.

Manual operations also risk causing soiling or fall of unwanted material into the internal parts of the stack, thus causing rejects or inferior quality.

Finally, the blades used for the manual operation wear out very rapidly and have to be changed frequently.

Automatic cutting devices have already been described (for example, in French patent publication No. 2,510,029 and in British patent publication No. 2,144,363). However, these devices are not entirely satisfactory.

One of the problems encountered in automatic cutting is control of the temperature of the cutting tool. It has been found that, to obtain a clean and correct cut on the one hand and to improve the life of the tool on the other hand, the cutting tool should have a temperature which is at least approximately constant during the whole cutting operation. The automatic devices disclosed in the patent publication mentioned above do not provide adequate temperature regulation.

Another problem encountered in automatic cutting is that of the flexibility of the sheet of plastics material. This lack of rigidity causes sinking of the parts of the intermediate sheet which extend beyond the glass sheets and a poor supporting of the parts of the intermediate plastic sheet facing the cutting tool.

OBJECTS OF THE INVENTION

It is an object of the invention to provide an improved device for automatic cutting by trimming off the edge parts which avoids the foregoing disadvantages and which by its regularity of cutting insures that it is no longer generally necessary to redress the edge of the sheet of plastics material after final assembly.

SUMMARY OF THE INVENTION

The device according to the invention comprises a cutting head provided with a cutting tool formed of a blade carried by a blade holder heated to a given temperature which is at least approximately constant; means for holding the parts of the plastics material sheet to be cut in a position at least substantially perpendicular to the plane containing the cutting edge of the blade and at least substantially perpendicular to the edge of the glass sheets; and means for causing relative displacement of the cutting head along the edge part of the pane.

Advantageously, the blade holder is heated by induction.

According to an embodiment of the invention, the means for causing relative displacement of the cutting head is a six-axis industrial robot. The pane to be trimmed is held in a fixed position, and the cutting head moved by the arm of the industrial robot is displaced along the edge part of the pane.

The device according to the invention may be used to carry out a complete cutting circuit of a pane. Alternatively, it may advantageously be associated with one or more similar devices each of which operates over a part of the circuit around the pane.

According to an embodiment of the invention, the means for holding the parts of the sheet of plastics material to be cut at least substantially perpendicular to the blade are formed of a cylindrical stem arranged in advance of the cutting blade in the direction of displacement of the blade.

Different cross-sections of the blade may be suitable. However, the preferred shape is a flat triangular plate which has two cutting edges, each corresponding to one of the two sides of the lower apex of the triangle. The point of the blade allows piercing of the plastics material during the first phase of cutting. The two cutting edges allow cutting in both directions.

When the device is programmed for cutting in one direction and then in the other (for example, in the first phase of cutting as described in the following), advantageously the device is provided with means for holding the part to be cut at least substantially perpendicular to the plane containing the cutting edges of the blade on one side of the blade and with similar means on the other side of the blade. These means may also be formed in each case of a cylindrical stem arranged on one side of the cutting blade and on the other. Apart from the function of facilitating attack of the cutting tool in the part to be cut, each of the cylindrical stems may play a role in removing the cutaway part when cutting is carried out in the reverse direction.

To the cylindrical stem may be attached a plate improving holding of a part of the plastics material extending beyond the plane facing the attack of the blade, especially at locations where this part is wide — that is to say, generally at the corners of the pane.

The means which hold the extending parts of the intermediate sheets to be cut away are advantageously controllably retractable so that numerous variations regarding the use or nonuse of these means, as a function of the direction of cutting, are possible.

The cutting blade, which is heated by conduction from the blade holder, is brought to a temperature which is generally from 200°-350° C. at the location of cutting. The blade holder (which is advantageously heated by induction) is brought to a temperature on the order of 750° C.

BRIEF DESCRIPTION OF THE DRAWINGS

FIG. 1 shows schematically a cutting head of a device according to the invention in its position for cutting by a laminated pane.

FIG. 1a shows the blade on an enlarged scale.

FIG. 2 shows a cutting head in plan view.

FIG. 3 shows the cutting head of FIG. 2 from the side.

FIG. 4 shows starting of cutting for cutting around a laminated pane.

DETAILED DESCRIPTION OF THE PRESENTLY PREFERRED EMBODIMENT

In FIG. 1 a cutting head 1 is shown in action during passage around a laminated pane 2 arranged at a cutting station in a horizontal position which is previously fixed and supported by supports 3.

The laminated pane 2, formed of two glass sheets 4, 5 and an intermediate sheet 6 formed of a blank having dimensions slightly greater than those of the glass sheets 4, 5, is held at the trimming station by means of a cylindrical pad 7 mounted at the end of a stem 8 of a vertical jack. The cylindrical pad 7 is applied at least approximately to the center of the laminated pane 2. The laminated pane 2 has previously been positioned in space according to precise reference points by a device which is not shown. The cutting head 1 is mounted at the end of a wrist 9 of a six-axis industrial robot (not shown).

Cutting is carried out by a flat triangular blade 10 heated by conduction from a blade holder 23 which itself is heated by induction. The blade 10 is applied during cutting against the edge of the laminated pane 2 by a jack as described below. As best seen in FIG. 1a, the blade 10 has two cutting edges 43, 44, each corresponding to one of the two sides of the inferior apex of the triangle formed by the blade 10. The angle of attack of the blade 10 is oriented as shown in FIG. 1a slightly towards the exterior relative to the laminated pane 2 so as to avoid attacking the edge of the glass sheets 4, 5.

Upstream of the blade 10 a first cylindrical stem 11 carried at the end of an arm 12 articulated about an axis 13 mounted on a support plate 14 holds an outwardly extending part 15 of the intermediate sheet 6 of plastics material to be cut in a position which is at least substantially perpendicular to the plane of the blade 10, and thus to the edge of the laminated pane 2, in order to facilitate attack by the blade 10 for cutting. The first cylindrical stem 11 is in contact against the lower glass sheet 5 of the laminated pane 2. A second cylindrical stem 16, carried at the end of an arm 17 articulated about an axis 18 in a similar manner to the first cylindrical stem 11, is arranged of the blade 10. It is shown in FIG. 1, retracted position—that is to say, disengaged from the laminated pane 2, which is in its rest position.

The robot is programmed to cause the cutting head 1 to follow slightly more than half the full distance around the laminated pane 2, the other half of the distance around the laminated pane 2 being followed by a second cutting head similar to that shown and carried by the wrist of a second six-axis industrial robot (also not shown). The use of two robots clearly allows reduction in duration of the trimming operation and thus improvement in the rate of production of the automatic assembly the cutting device of the invention may be inserted.

In FIGS. 2 and 3 there is shown in greater detail the cutting head 1 of the automatic trimming device. The cutting head 1 comprises the support plate 14 surmounted by a cylindrical plate 19 which attaches to the wrist 9 of the industrial robot. Below the support plate 14 is fixed a slider 20 along which slides a bearing 21. Below the bearing 21 is mounted a support 22 of the blade holder 23. The triangular blade 10 is fixed at the end of the blade holder 23 by means of a nut 24. Around the blade holder 23 is mounted an induction heating element 25 formed of a copper tube arranged in coils connected by means not shown to an electric circuit contained in a casing 45 and a cooling circuit.

On the side of the support 22 of the blade holder 23 is fixed the end of a stem 26 of a jack 27 fixed by means of a screw 28 to a member 29 integral with the support plate 14. The jack 27 acts in parallel to the slider 20. During cutting, the jack 27 applies the blade 10 with a predeterminable force (which is also programmable) against the edge of the laminated pane 2 through the support 22 of the blade holder 23.

At the rear end of the support plate 14 relative to its fixing on the wrist 9 of the robot, on each side of the support plate 14 and mounted integrally on it, are U-shaped bearings 30, 31. The U-shaped bearings 30, 31 carry the axes 13, 18, respectively. The two arms 12, 17 carry at their ends the cylindrical stems 11, 16, respectively. In the working position, as shown in FIG. 3 for the first cylindrical stem 11, each cylindrical stem 11, 16 is arranged slightly inclined relative to the peripheral parts of the surfaces of the glass sheets 4, 5, so that it supports the part to be cut of the intermediate sheet 6 in a position at least substantially perpendicular to the edge of the laminated pane 2 and to the blade 10 at the point of cut. Each cylindrical stem 11, 16 is connected by means of an axis 32, 33 to the end of a stem 34, 35 of a jack 36, 37. The body of each jack 36, 37 is articulated on another axis 38, 39 carried by an ear 40, 41 fixed to the support plate 14.

On the first cylindrical stem 11 (which is arranged upstream of the blade 10 in the principal direction of cutting), there is also mounted a supplementary plate 42. The supplementary plate 42 is provided to improve the support of the part of the intermediate sheet 6 to be cut where its dimensions are the greatest—that is, at the corners of the laminated pane 2.

The device operates in the following manner.

A laminated pane 2 formed of two sheets of glass 4, 5 and an intermediate sheet 6 of polyvinylbutyral in the form of a quadralateral blank is brought by an associated device (not shown) to the cutting station for trimming and arranged in space according to precise reference points. It is then immobilized on the supports 3 by means of the cylindrical pad 7.

The two six-axis robots are programmed to carry out simultaneously cutting around a little more than half of the periphery of the laminated pane 2. Each of the two cutting heads 1 is brought by the wrist 9 of its robot to the starting position, shown schematically in FIG. 4. The blade 10 penetrates into the part to be cut of the intermediate layer 6 substantially in the middle of the strip to be cut after the two cylindrical stems 11, 16 have been actuated by the jacks 36, 37 to bring them to their working positions—that is to say, to support the emerging part of the intermediate sheet 6 to be cut.

Cutting is first carried out according to an arrow A toward the edge of the laminated pane 2, according to a curved path of the blade 10 to a position which is substantially tangential to the edge, then along an arrow B by return of the blade 10 according to the same projectory, and then up to the edge of the intermediate sheet 6. The paths are shown schematically by broken line t.

The blade 10 then returns to the tangent point according to the arrow A. Because it is constantly applied against the edge of the laminated pane 2 by the combined action of movement of the wrist 9 of the robot and the jack 27, the blade 10 follows the desired path around the laminated pane 2.

The first cylindrical stem 11, which is arranged upstream in contact with the edge of the lower sheet of glass 5 lifts the part to be carried of the intermediate sheet 6 which is then presented to the blade 10 to a position at least substantially perpendicular to the plane of the blade 10. The supplementary plate 42, which is integral with the first cylindrical stem 11 and which is arranged even further upstream by several centimeters, provides a first support of the strip to be cut, especially at the locations of the corners of the laminated pane 2—that is to say, at the corners of the quadralateral forming the blank. The second cylindrical stem 16 may, as required, be placed in its working position applied against the lower surface of the laminated pane 2, where it then carries out the role of guiding the cut strip as it falls away.

When each of the two cutting heads 1 has followed slightly more than a half periphery of the laminated pane 2, so that each joins the start of a cut carried out by the other, the trimming is terminated, and the two cutting heads 1 are disengaged from the edge of the laminated pane 2 by the arms of the robots. The laminated pane 2 is then removed to the following station.

The device according to the invention further has the advantage that it may be used for cutting of very narrow strips and also for strips having very variable widths during a single journey around the periphery of the laminated pane.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. An automatic cutting device for trimming the parts of an intermediate sheet of plastic material which extends beyond a pane during manufacture of laminated panes, said automatic cutting device comprising:
   (a) a support plate;
   (b) a blade holder mounted on said support plate for sliding movement in a first direction relative to said support plate;
   (c) a blade having two cutting edges carried by said blade holder and extending from said blade holder in a second direction, perpendicular to said first direction;
   (d) first means mounted on said support plate for biasing said blade in said first direction;
   (e) second means for heating said blade holder to an at least approximately constant temperature;
   (f) a first support mounted on said support plate and located on a first side of said blade for holding a part of the sheet of plastic material to be cut in a position at least substantially perpendicular to said cutting edges of said blade;
   (g) a second support mounted on said support plate and located on a second side of said blade for holding a part of the sheet of plastic material to be cut in a position at least substantially perpendicular to said cutting edges of said blade;
   (h) third means for pivoting said first support back and forth between an operative and an inoperative position;
   (i) fourth means for pivoting said second support back and forth between an operative and an inoperative position; and
   (j) fifth means for displacing said support plate along the edge of the pane.

2. An automatic cutting device according to claim 1 wherein said second means heats said blade holder by induction.

3. An automatic cutting device according to claim 1 wherein said fifth means is the wrist of a six-axis industrial robot.

4. An automatic cutting device according to claim 1 wherein said second support comprises a cylindrical stem arranged upstream of said blade.

5. An automatic cutting device according to claim 4 wherein said cylindrical stem makes contact with a lower surface of the pane during use of said cutting device.

6. An automatic cutting device according to claim 4 and further comprising a supplementary plate arranged upstream of said cylindrical stem which improves support of the part of the intermediate sheet to be cut.

7. An automatic cutting device according to claim 4 wherein said first support comprises a cylindrical stem arranged downstream of said blade.

8. An automatic cutting device according to claim 1 wherein said first means comprises a jack which, during use of said device, holds said blade in contact with the edge of the pane.

9. An automatic cutting device according to claim 1 wherein said first support comprises a cylindrical stem arranged downstream of said blade.

10. An automatic cutting device for trimming the parts of an intermediate sheet of plastic material which extends beyond a pane during manufacture of laminated panes, said automatic cutting device comprising:
   (a) a support plate;
   (b) a blade holder mounted on said support plate for sliding movement in a first direction relative to said support plate;
   (c) a blade having two cutting edges carried by said blade holder and extending from said blade holder in a second direction, perpendicular to said first direction;
   (d) first means for heating said blade holder to an at least approximately constant temperature;
   (e) a first support mounted on said support plate and located on a first side of said blade for holding a part of the sheet of plastic material to be cut in a position at least substantially perpendicular to said cutting edges of said blade;

(f) a second support mounted on said support plate and located on a second side of said blade for holding a part of the sheet of plastic material to be cut in a position at least substantially perpendicular to said cutting edges of said blade;

(g) second means for pivoting said first support back and forth between an operative and an inoperative position;

(h) third means for pivoting said second support back and forth between an operative and an inoperative position; and (i) fourth means for displacing said support plate along the edge of the pane.

11. An automatic cutting device according to claim 10 wherein said first means heats said blade holder by induction.

12. An automatic cutting device according to claim 10 wherein said fourth means is the wrist of a six-axis industrial robot.

13. An automatic cutting device according to claim 10 wherein said second support comprises a cylindrical stem arranged upstream of said blade.

14. An automatic cutting device according to claim 13 wherein said cylindrical stem makes contact with a lower surface of the pane during use of said cutting device.

15. An automatic cutting device according to claim 13 and further comprising a supplementary plate arranged upstream of said cylindrical stem which improves support of the part of the intermediate sheet to be cut.

16. An automatic cutting device according to claim 17 wherein said first support comprises a cylindrical stem arranged downstream of said blade.

17. An automatic cutting device according to claim 10 and further comprising a jack which, during use of said device, holds said blade in contact with the edge of the pane.

18. An automatic cutting device according to claim 10 wherein said first support comprises a cylindrical stem arranged downstream of said blade.

* * * * *